(12) United States Patent
Konno (10) Patent No.: US 6,529,332 B2
(45) Date of Patent: *Mar. 4, 2003

(54) COLOR INTEGRATING OPTICAL DEVICE AND DISPLAY OPTICAL SYSTEM

(75) Inventor: Kenji Konno, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/536,915

(22) Filed: Mar. 28, 2000

(65) Prior Publication Data

US 2002/0063966 A1 May 30, 2002

(30) Foreign Application Priority Data

Mar. 29, 1999 (JP) .......................... 11-086077

(51) Int. Cl.[7] .......................... G02B 27/14; G03B 21/00
(52) U.S. Cl. .......................... 359/634; 353/31; 359/618
(58) Field of Search .......................... 359/618, 634, 359/637; 353/31, 34; 348/750

(56) References Cited

U.S. PATENT DOCUMENTS 4,163,542 A * 8/1979 La Russa .................... 359/618
5,185,712 A * 2/1993 Sato et al. .................... 359/618
6,118,588 A * 9/2000 Yamamoto .................... 359/618

FOREIGN PATENT DOCUMENTS

| JP | 4-175742 A | | 6/1992 | |
| JP | 4-216543 A | | 8/1992 | |
| JP | 4-216543 | * | 8/1992 | ........... G03B/33/12 |
| JP | 4-310913 A | | 11/1992 | |
| JP | 5-107501 A | | 4/1993 | |
| JP | 6-25831 A | | 4/1994 | |

* cited by examiner

Primary Examiner—Georgia Epps
Assistant Examiner—Alicia M Harrington
(74) Attorney, Agent, or Firm—Sidley Austin Brown & Wood LLP (57) ABSTRACT

A color integrating optical device for integrating different color rays from a plurality of display devices each of which has a condenser lens in front thereof and emitting the integrated color rays to a non-telecentric projecting optical system, including a dichroic mirror plate having a dichroic film, the dichroic mirror integrating the color rays by the dichroic film in which a color rays from one of display devices reflects thereon and another color rays from the other of display devices transmits thereon, the dichroic film being formed an incident surface of a color rays to be reflected, and a dummy plate provided on an optical path of color rays to be reflected by the dichroic film so that an unnecessary rays caused by part of the color rays being reflected at the dummy plate does not emit to the non-telecentric projecting optical system.

18 Claims, 6 Drawing Sheets

COLOR INTEGRATING OPTICAL DEVICE AND DISPLAY OPTICAL SYSTEM

This applications is based on application No. H11-086077 filed in Japan on Mar. 29, 1999, the entire content of which is hereby incorporated by reference.

BACKGROUND OF THE INVENTION

1. Field of the Invention

The present invention relates to a color integrating optical device, and more specifically, to a color integrating optical device for projecting different pieces of color information from a plurality of display panels after integrating the pieces of information.

2. Description of the Prior Art

Conventionally, in color integrating optical devices, a so-called multi-plate method is frequently used for image display devices used as display panels. This is particularly intended for performing color display. In order to perform color integration when color display is performed, conventionally, a dichroic mirror using surface reflection or a cross dichroic prism has been mainly used.

However, in the structure of the dichroic mirror using surface reflection, since reflection is directly performed at the dichroic film on the surface, some of the light rays from the image display devices pass through a glass plate serving as the substrate and the other of the light rays do not pass there through according to whether the light rays are reflected at the dichroic mirror or not, so that the lengths of the optical paths to the projection surface differ among the light rays. Consequently, the amounts of the caused astigmatic differences are different, which makes correction difficult. As a result, the image quality is degraded.

To make the lengths of the optical paths the same, recently, a dichroic mirror comprising glass plates cemented together has been used, for example, as described in Japanese Laid-open Patent Application No. H5-107501. The dichroic mirror of this prior art comprises two glass plates cemented together. The two glass plates have the same thickness, and dichroic coating is applied to one of the opposing surfaces thereof. In such a dichroic mirror, since both the transmitted light rays and the reflected light rays pass through the two glass plates, these light rays are optically absolutely equivalent. As the dichroic mirror, one having the above-described structure is mainly used.

Concrete examples of a conventional color integrating optical device using a dichroic mirror includes one successively performing color integration with two dichroic mirrors, for example, as described in Japanese Laid-open Patent Application No. H4-175742. Another example is one performing color integration by use of a dichroic mirror where dichroic coating is applied to the cemented surfaces of the glass plates cemented together as described above in order to correct the difference of the optical path caused because of the dichroic mirror as described in Japanese Laid-open Patent Application No. H4-310913.

Another example is one in which although a dichroic mirror using surface reflection is used, the lens back focal length is long and a dummy glass plate is disposed in order to correct the difference of the optical path caused because of the dichroic mirror. Specifically, one has been proposed in which the lens back focal length is long enough for three plates inclined with respect to the optical axis to be disposed between the projection optical system and the image display devices as described in Japanese Laid-open Patent Application No. H4-216543, or one has been proposed in which the lens back focal length is long enough for four plates inclined with respect to the optical axis to be disposed between the projection optical system and the display =panels as described in Japanese Laid-open Utility Model Application No. H6-25831.

However, in the structure as described in Japanese Laid-open Patent Application No. H4-175742, since the number of dichroic mirrors through which the light rays from the image display devices pass differs among the image display devices, the lengths of the optical paths to the projection surface are different and the amounts of the caused astigmatic difference are different as mentioned above, so that when the number of pixels increases, the performance is unacceptable.

In the structure as described in Japanese Laid-open Patent Application No. H4-310913, although the lengths of the optical paths are the same, since the dichroic mirror has the structure in which light is reflected by the dichroic film provided on the rear surface of a glass plate or in the vicinity of the rear surface, so-called unnecessary light rays are generated.

Figure 5A:
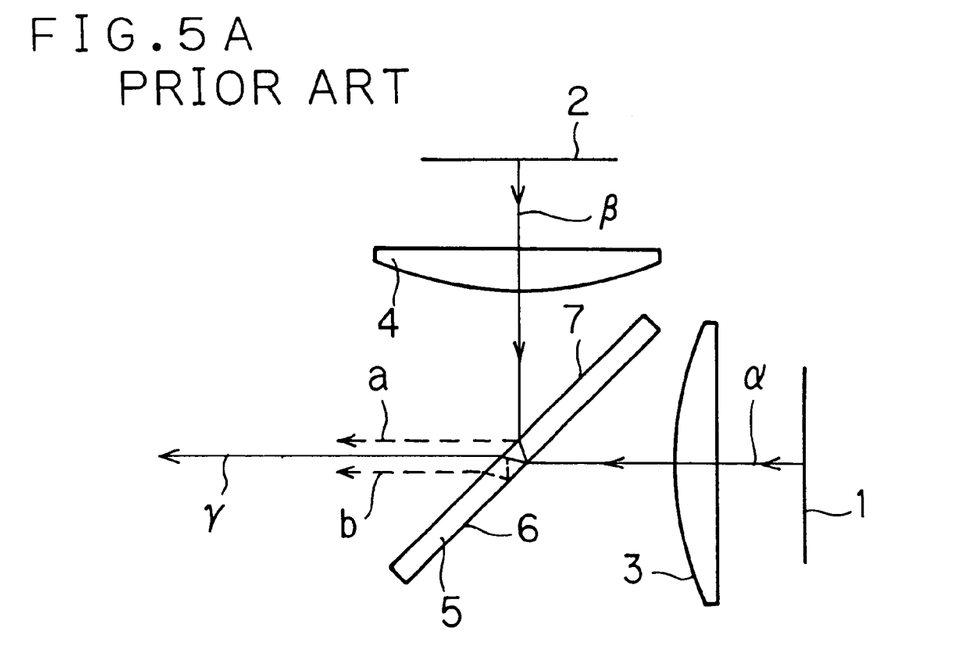
FIGS. 5A and 5B schematically show how the unnecessary light rays are generated.
Figure 5B:
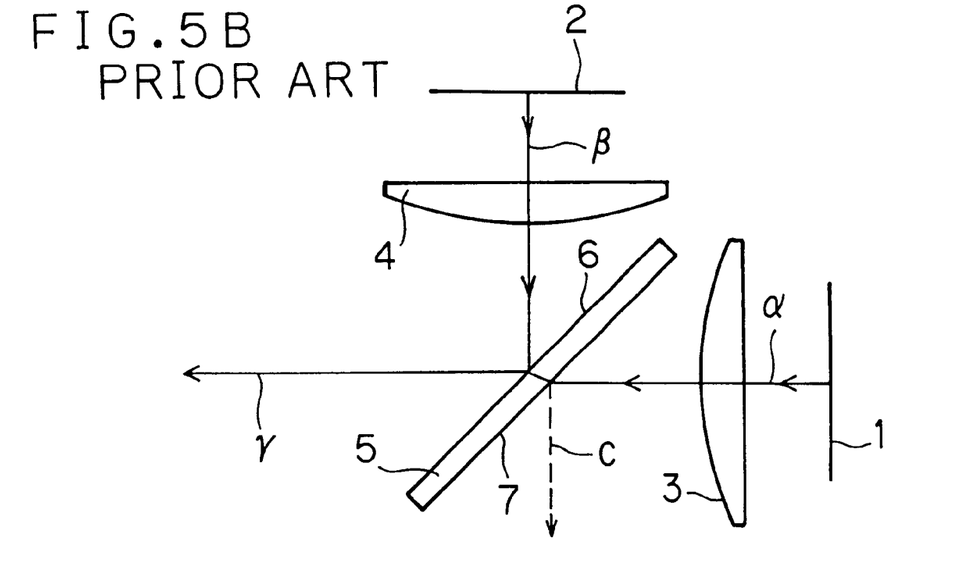

FIGS. 5A and 5B schematically show how such unnecessary light rays are generated. In these figures, reference numerals 1 and 2 represent display panels, reference numerals 3 and 4 represent condenser lenses of the display panels 1 and 2, respectively, and reference numeral 5 represents a dichroic mirror. The dichroic mirror 5 has a dichroic film 6 formed on the rear surface viewed from the reflection side (the side of the display panels 2) in FIG. 5A and on the obverse surface viewed from the reflection side (the side of the display panel 2) in FIG. 5B.

Assume now that a light ray emanating from the display panel 1 and shown by the arrow a passes through the condenser lens 3 and is transmitted by the dichroic mirror 5, that a light ray emanating from the display panel 2 and shown by the arrow β passes through the condenser lens 4 and is reflected at the dichroic mirror 5 and that these light rays are integrated into a light ray shown by the arrow γ. At this time, although a reflection preventing film 7 is provided on the surface where the light ray of the arrow β is incident on the dichroic mirror 5 (the obverse surface) as shown in FIG. 5A, reflection is not completely prevented, and part of the light ray of the arrow β is reflected at the surface to become an unnecessary light ray as shown by the dashed arrow a.

Further, part of the light ray of the arrow β normally reflected at the dichroic film 6 is further reflected at the reflection preventing film and is again reflected at the dichroic film 6 to become an unnecessary light ray as shown by the dashed arrow b. These unnecessary light rays form an unnecessary image in the vicinity of the image formed by the normal light rays as shown by the arrow γ, so that the image performance deteriorates.

On the contrary, when the dichroic film 6 is provided on the surface where the light ray of the arrow β is incident on the dichroic mirror 5 (the obverse surface) as shown in FIG. 5B, since merely the light ray of the arrow β is reflected as it is, no unnecessary light ray is generated. Instead, in this case, since the light ray of the arrow α passes through the dichroic mirror 5 and the light ray of the arrow β does not pass therethrough, the lengths of the optical paths from the display panels 1 and 2 to a non-illustrated projection surface are different as heretofore mentioned, so that the amounts of the caused astigmatic differences are different to make correction difficult. As a result, the image quality is degraded.

In FIG. 5B, there are cases where the reflection preventing film 7 is provided on the surface where the light ray of the arrow α is incident on the dichroic mirror 5 (the rear surface), and even if reflection is not completely prevented and part of the light ray of the arrow α is reflected at this surface to become an unnecessary light ray as shown by the dashed arrow c, the unnecessary light ray does not become a problem because it never reaches the projection surface. In this case, the reflection preventing film 7 is used rather for increasing the transmittance to thereby improve the image efficiency.

In the structure as described in Japanese Laid-open Patent Application No. H4-216543 or Japanese Laid-open Utility Model Application No. H6-25831, the long lens back focal length causes a problem. That is, when liquid crystal display panels are used as the image display devices, since liquid crystal has a characteristic that the display properties thereof vary according to the angle of incidence of illumination light, to illuminate the liquid crystal display devices at the same angle in order to avoid the display property variation, it is necessary to illuminate the liquid crystal display panels with a telecentric optical system. In a telecentric optical system, the lens diameter of the projection optical system should be extremely large when the lens back focal length is long.

Figure 6A:
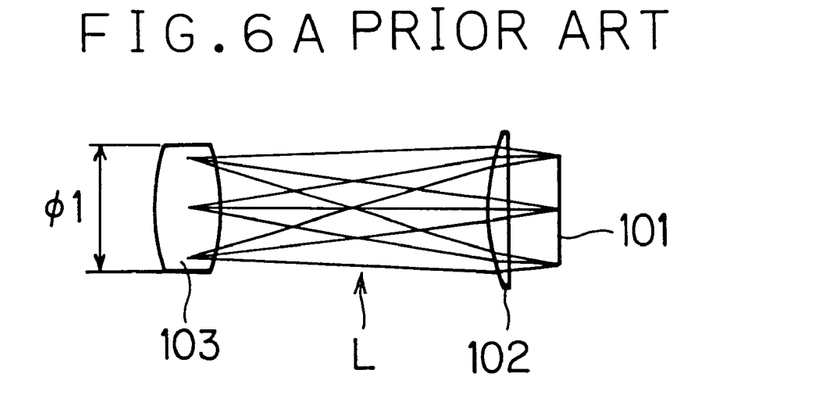
FIGS. 6A to 6C are views schematically explaining the problem involved in the illumination of the liquid crystal display panel.
Figure 6B:
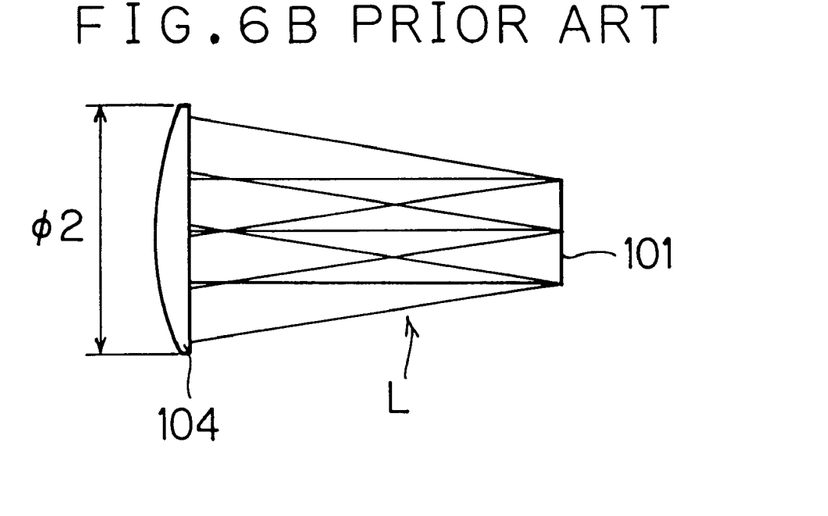
Figure 6C:
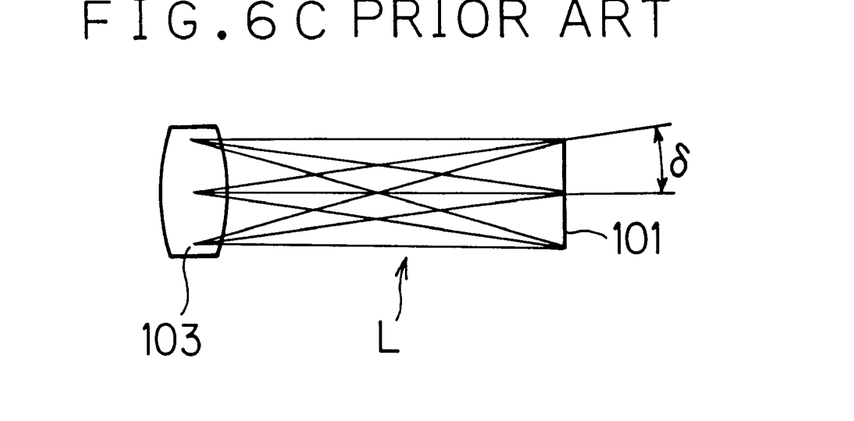

FIGS. 6A to 6C are views schematically explaining the problem involved in the illumination of the liquid crystal display panels. Mentioning the conclusion at first, by providing a condenser lens 102 before a display panel 101 so that the optical system is substantially telecentric in the part immediately before the display panel 101 as shown in FIG. 6A, a light ray L from the display panel 101 is incident on a projection optical system 103 without diverging even if the optical system is mainly non-telecentric and the lens back focal length is comparatively large, so that the lens diameter φ1 can be reduced.

On the contrary, when the lens back focal length is long in an optical system being telecentric as a whole, the light ray L from the display panel 101 diverges as shown in FIG. 6B, so that the lens diameter φ2 of a projection optical system 104 on which the diverging light ray L is incident is extremely large. This requires extra space for disposing the projection optical system 104 and increases the cost. The structure as described in Japanese Laid-open Patent Application No. H4-216543 or Japanese Laid-open Utility Model Application No. H6-25831 involves such a problem.

A lens back focal length being longer than necessary places an enormous load on the optical system, so that it is difficult to obtain excellent optical performance. When the optical system is non-telecentric as a whole as shown in FIG. 6C, even if the size of the projection optical system 103 can be reduced, the display panel 101 is not illuminated at the same angle because of the absence of a condenser lens, so that the angle shown by 6 differs, for example, between the central part and the peripheral part of the image plate as shown in the figure. This results in a nonuniform image. The light ray L in FIGS. 6A to 6C are illustrated in a form serving also as illumination light incident on the display panel 101 in the part immediately before the display panel 101.

In the firstly mentioned structure using a cross dichroic prism, although no problem arises in image quality and unnecessary light rays, a large glass block is necessary because the volume is generally large. In addition, since four right angle prisms are cemented together and the surfaces sandwiching the right angle sides are coated with a dichroic film, extremely high accuracy is required for cementing the prisms, so that the cost is extremely high.

SUMMARY OF THE INVENTION

An object of the present invention is to provide a color integrating optical device performing color integration using mirrors, being low in cost and realizing excellent image quality.

To achieve the above-mentioned object, according to the present invention, a color integrating optical device for integrating different color rays from a plurality of display devices each of which has a condenser lens in front thereof and emitting the integrated color rays to a non-telecentric projecting optical system, comprising:

a dichroic mirror plate having a dichroic film, the dichroic mirror integrating the color rays by the dichroic film in which a color rays from one of display devices reflects thereon and another color rays from the other of display devices transmits thereon, the dichroic film being formed an incident surface of a color rays to be reflected;

a dummy plate provided on an optical path of color rays to be reflected by the dichroic film so that an unnecessary rays caused by part of the color rays being reflected at the dummy plate does not emit to the non-telecentric projecting optical system; and wherein the following condition is fulfilled:

$$2 < \{LB - (t \div \cos\theta) \times 3 \times n\} \div D < 5$$

where:

LB is a distance from a most integrating optical device side surface of the non-telecentric optical system to the condenser lens;

n is the number of plates disposed on the optical path;

θ is a tilt angle of the thickest plate with respect to the optical axis of the non-telecentric optical system;

t is a thickness of the thickest plate; and

D is a length of the display device in direction parallel to a plate formed by the color ray are bent by the dichroic mirror plate.

Moreover, according to the present invention, a display optical system comprises:

A color integrating optical device for integrating different color rays from a plurality of display devices each of which has a condenser lens in front thereof and emitting the integrated color rays to a non-telecentric projecting optical system, comprising:

a dichroic mirror plate having a dichroic film, the dichroic mirror integrating the color rays by the dichroic film in which a color rays from one of display devices reflects thereon and another color rays from the other of display devices transmits thereon, the dichroic film being formed an incident surface of a color rays to be reflected;

a dummy plate provided on an optical path of color rays to be reflected by the dichroic film so that an unnecessary rays caused by part of the color rays being reflected at the dummy plate does not emit to the non-telecentric projecting optical system; and where in the following condition is fulfilled:

$$2 < \{LB - (t \div \cos\theta) \times 3 \times n\} \div D < 5$$

where:

LB is a distance from a most integrating optical device side surface of the non-telecentric optical system to the condenser lens;

n is the number of plates disposed on the optical path;

θ is a tilt angle of the thickest plate with respect to the optical axis of the non- telecentric optical system;

t is a thickness of the thickest plate; and

D is a length of the display device in direction parallel to a plate formed by the color ray are bent by the dichroic mirror plate; and a projection optical system for projecting the image light rays, wherein an optical member for correcting an astigmatic difference caused by the color integrating optical device is provided in the projection optical system.

BRIEF DESCRIPTION OF THE DRAWINGS

This and other objects and features of this invention will become clear from the following description, taken in conjunction with the preferred embodiments with reference to the accompanying drawings in which.

DESCRIPTION OF THE PREFERRED EMBODIMENTS

Figure 1:
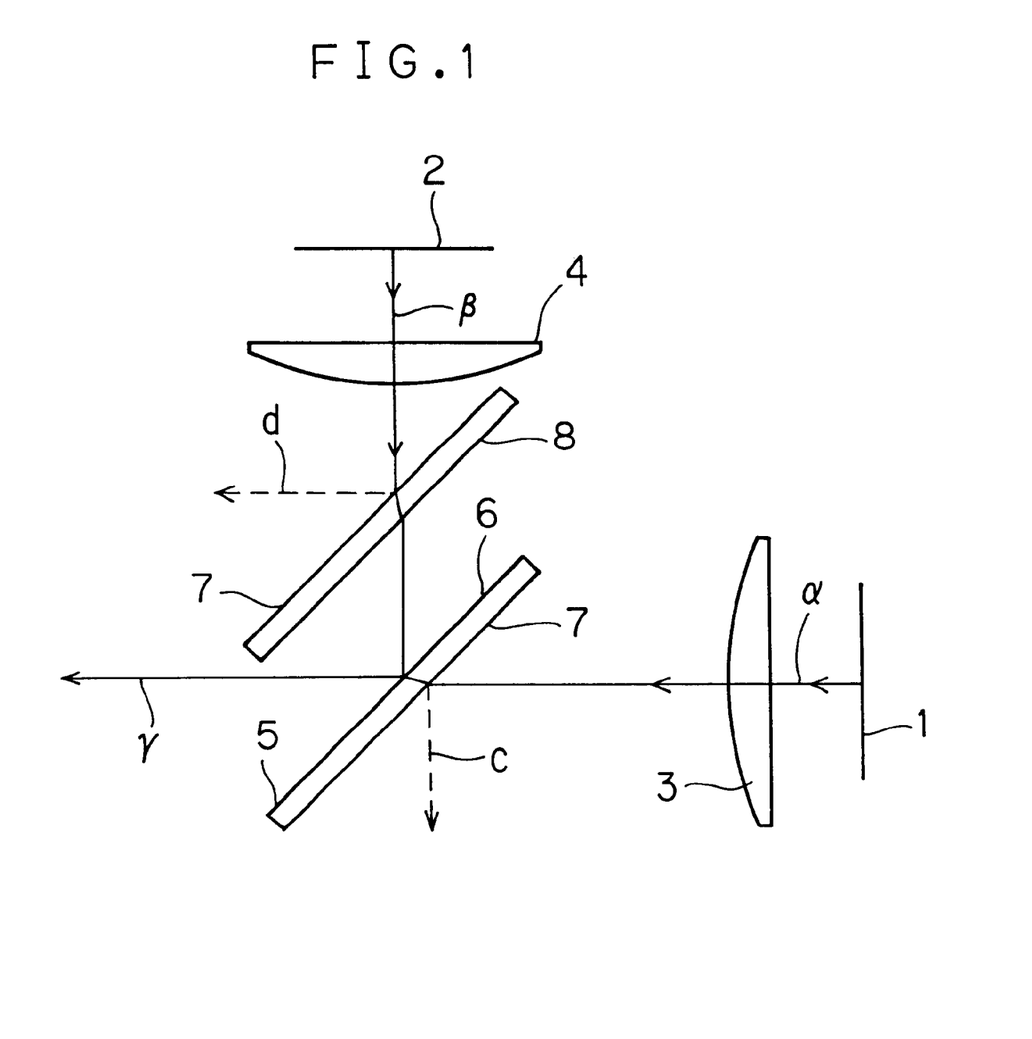
FIG. 1 schematically shows the basic structure of a color integrating optical device of the present invention.

Hereinafter, embodiments of the present invention will be described with reference to the drawings. FIG. 1 schematically shows the basic structure of a color integrating optical device of the present invention. In the figure, reference numerals 1 and 2 represent display panels, reference numerals 3 and 4 represent condenser lenses of the display panels 1 and 2, respectively, reference numeral 5 represents a dichroic mirror, and reference numeral 8 represents a dummy glass. The dichroic mirror 5 has a dichroic film 6 formed on the obverse surface viewed from the reflection side (the side of the display panel 2). That is, in the present invention, a dichroic mirror using surface reflection is used.

Assume now that a light ray emanating from the display panel 1 and shown by the arrow α passes through the condenser lens 3 and is transmitted by the dichroic mirror 5, that a light ray emanating from the display panel 2 and shown by the arrow β passes through the condenser lens 4 and the dummy glass 8 and is reflected at the dichroic mirror 5 and that these light rays are integrated into a light ray shown by the arrow γ. Here, the dummy glass 8 creates an optical path corresponding to the dichroic mirror 5 to thereby make the optical path of the light ray of the arrow β optically equivalent to that of the light ray of the arrow α.

At this time, there are cases where a reflection preventing film 7 is provided on the surface where the light ray of the arrow β is incident on the dummy glass 8, and even if reflection is not completely prevented and part of the light ray of the arrow β is reflected at this surface to become an unnecessary light ray as shown by the dashed arrow d, the unnecessary light ray does not become a problem because it never reaches the projection surface. In this case, the reflection preventing film 7 is used rather for increasing the transmittance to thereby improve the image efficiency. Since the dichroic film 6 is provided on the surface where the light ray of the arrow β is incident on the dichroic mirror 5 (the obverse surface), merely the light ray of the arrow β is reflected as it is, and no unnecessary light ray is generated here.

There are cases where the reflection preventing film 7 is provided on the surface where the light ray of the arrow α is incident on the dichroic mirror 5 (the reverse surface) as previously mentioned with reference to FIG. 5B, and even if reflection is not completely prevented and part of the light ray of the arrow α is reflected at this surface to become an unnecessary light ray as shown by the dashed arrow c, the unnecessary light ray does not become a problem because it never reaches the projection surface. In this case, like in the above-described case, the reflection preventing film 7 is used rather for increasing the transmittance to thereby improve the image efficiency.

According to the present invention, by providing the above-described basic structure, the optical paths from the display panels 1 and 2 to a non-illustrated projection surface are made optically equivalent by the dummy glass 8 so that the amounts of the caused astigmatic differences are not different to thereby facilitate correction, and even if an unnecessary light ray is generated, it is prevented from reaching the projection surface, whereby excellent image quality is realized.

Figure 2A:
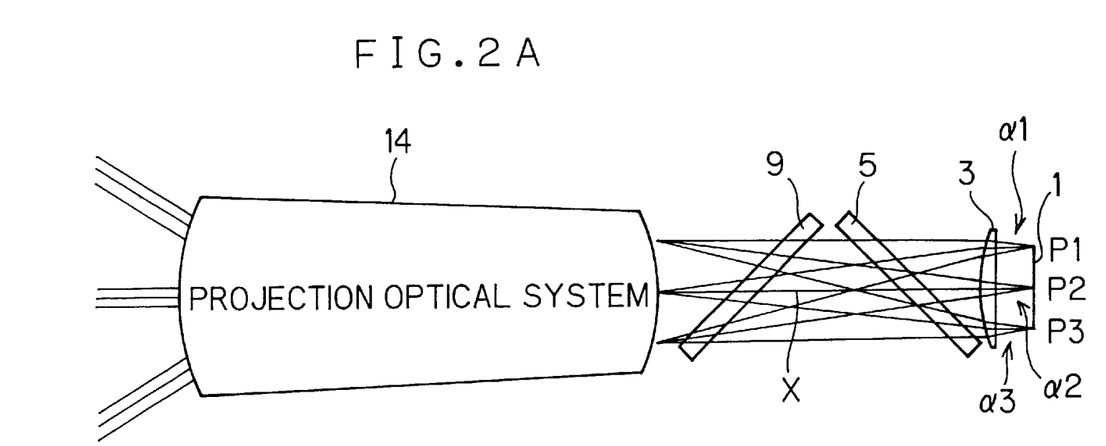
FIGS. 2A and 2B are schematic views showing display optical systems using the basic structure of the color integrating optical device of the present invention.
Figure 2B:
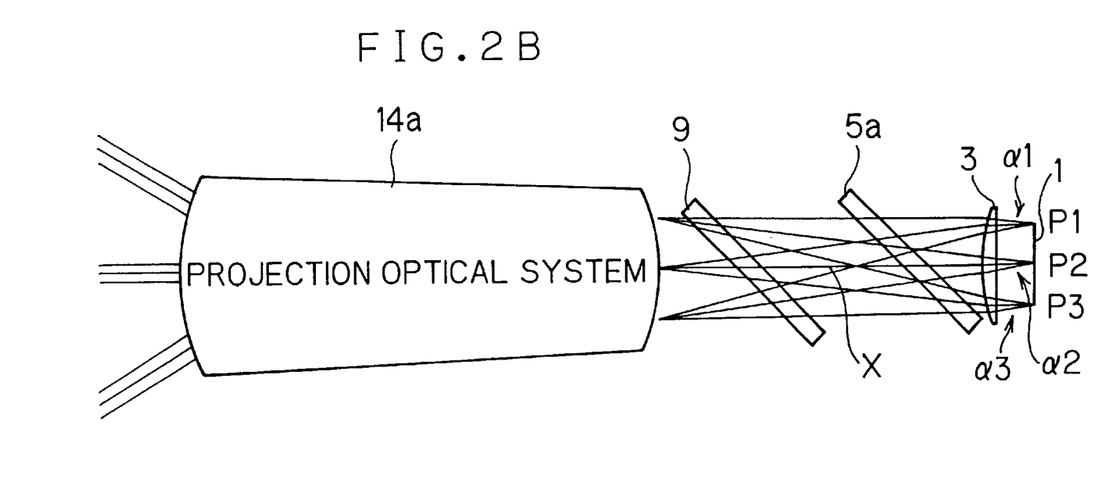

FIGS. 2A and 2B schematically show display optical systems using the basic structure of the color integrating optical device of the present invention. In these figures, the optical systems are illustrated with attention being focused on only the optical path from one display panel. FIGS. 2A and 2B correspond to first and second embodiments described later, respectively. As shown in the figures, the color integrating optical devices of the present invention are mainly non-telecentric as mentioned previously. In such optical systems, first, as shown in FIG. 2A, since the dichroic mirror 5 is disposed, as a structure for performing color integration, so as to be inclined leftward on the plate of the figure so as to form a predetermined angle (for example, 45 degrees) with respect to the optical axis X on the optical path, an astigmatic difference is caused by the light from the display panel 1 passing through the dichroic mirror 5.

Further, for example, the principal rays of light rays α1, α2 and α3 emanating from the upper end P1, the center P2 and the lower end P3 of the display panel 1 are incident on the dichroic mirror 5 at different angles by the light rays α1, α2 and α3 passing through the condenser lens 3, so that the degree of generation of the astigmatic difference differs between the upper and the lower parts of the image plate. Therefore, as shown in FIG. 2A, a dichroic mirror 9 as thick as the dichroic mirror 5 is disposed on the optical path so as to form the same angle with respect to the optical axis X as the dichroic mirror 5 and so as to be inclined toward the opposite side, that is, rightward on the plate of the figure.

By doing this, the difference in the degree of generation of the astigmatic difference is canceled between the upper and the lower parts of the image plate, so that the difference in astigmatic difference among positions on the image plate is eliminated. This applies to the case where a dummy glass is disposed instead of the dichroic mirror. However, since the astigmatic difference itself is not eliminated, in order to correct the astigmatic difference of the light ray from the display panel 1 having passed through the dichroic mirrors 5 and 9, in a projection optical system 14, a lens surface having different optical powers in the directions parallel and vertical to the plane of the figure (being toric) is disposed in such a manner that the lens back focal length is not increased. Examples of this surface include a cylinder surface, a toric surface and a free-form surface.

It is desirable that these be plastic lenses because plastic lenses are easy to manufacture. In order to obtain excellent projection performance, it is desirable to provide astigmatic difference correcting members in the projection optical system as described above. However, it is undesirable to insert astigmatic difference correcting members such as cylinder lens elements in the lens back focal length, because the insertion makes it necessary to increase the lens back focal length. For this reason, the astigmatic difference correcting members are provided in the projection optical system.

According to the structure of the color integrating optical device, there are cases where it is necessary that the dichroic mirrors be inclined in the same direction. For example, as shown in FIG. 2B, the dichroic mirrors 5a and 9 are both disposed, as a structure for performing color integration, so as to be inclined leftward on the plane of the figure so as to form a predetermined angle (for example, 45 degrees) with respect to the optical axis X on the optical path, so that an astigmatic difference is caused by the light from the display panel 1 passing through the dichroic mirrors 5a and 9.

Further, for example, the principal rays of the light rays $\alpha 1$, $\alpha 2$ and $\alpha 3$ emanating from the upper end P1, the center P2 and the lower end P3 of the display panel 1 are incident on the dichroic mirror 5a at different angles by the light rays $\alpha 1$, $\alpha 2$ and $\alpha 3$ passing through the condenser lens 3 and the light rays $\alpha 1$, $\alpha 2$ and $\alpha 3$ are then incident on the dichroic mirror 9 inclined at the same angle, so that the degree of generation of the astigmatic difference further differs between the upper and the lower parts of the image plane.

In order to correct the astigmatic difference that differs between the upper and the lower parts of the image plane as described above, an element asymmetrical in the vertical direction, such as a free-form surface or lens decentering in the vertical direction of the image plane, is disposed in the projection optical system 14a. However, this is undesirable when the difference in astigmatic difference between the upper and the lower parts of the image plane varies among display panels, because the difference cannot be reduced by the correction by the projection optical system.

However, by providing the structure as shown in FIG. 2B, the lens back focal length can be reduced. This will be detailed later. As the dichroic mirrors 5 and 5a, ones having different wavelength regions of transmission and reflection are used because of the difference in the structure of the color integrating optical device. The color integrating optical device of this embodiment employs a structure in which the shorter sides of the display panels are parallel to the planes where light is bent by the dichroic mirrors. With this structure, the lens back focal length can be reduced, so that the size of the optical system can be reduced.

The color integrating optical device of this embodiment is structured so as to fulfill the following condition (1):

$$2 < \{LB - (t \div \cos \theta) \times 3 \times n\} \div D < 5 \quad (1)$$

where:
  LB is a distance from a most integrating optical device side surface of the non-telecentric optical system to the condenser lens;
  n is the number of plates disposed on the optical path;
  $\theta$ is a tilt angle of the thickest plate with respect to the optical axis of the non-telecentric optical system;
  t is a thickness of the thickest plate; and
  D is a length of the display device in direction parallel to a plane formed by the color ray are bent by the dichroic mirror plate.

Here, the planes refer to parallel planes transmitting light such as dichroic mirrors or dummy glasses.

Here, LB, that is, the lens back focal length indicates the size of the actual physical space. When bending mirrors (in this embodiment, dichroic mirrors) are inserted therein, the effective bending space is reduced according to the thickness of the mirrors and the space necessary for holding the mirrors. The thickness and the holding space of a mirror depends on the angle of inclination, the thickness corresponds to ($t \div \cos \theta$) in the direction of the optical axis, and considering that the mirror is held from the front and the rear, the holding space is considered approximately twice the thickness. From these, a space of ($t \div \cos \theta$)×3 is necessary for one mirror.

Therefore, the effective bending space is the difference when the necessary holding space for one mirror multiplied by the number of mirrors is subtracted from the lens back focal length. This calculation applies to the case where dummy glasses are used instead of mirrors. While the thicknesses and the angles of inclination of the plates are regarded as the same in this embodiment, when the case where they are different is strictly defined, ($t \div \cos \theta$)×n of the condition (1) is replaced by $\Sigma-(t \div \cos \theta i)$ where i is an integer not less than 1 and not more than n, and the sum total of the values for the plates represented by i is obtained.

The images of three display panels can be integrated when the effective bending space is twice the above-mentioned length D. When the effective bending space is smaller than twice, image integration as color display cannot be performed. It is undesirable that the effective bending space be more than five times the length D, because the lens back focal length is longer than necessary, which increases the overall size of the optical system to increase the cost and makes it difficult to achieve excellent optical performance. When the effective bending space is not less than 2.5 times and not more than 4 times the length D, the mirrors can be sufficiently held and excellent optical performance can be obtained.

Figure 3:
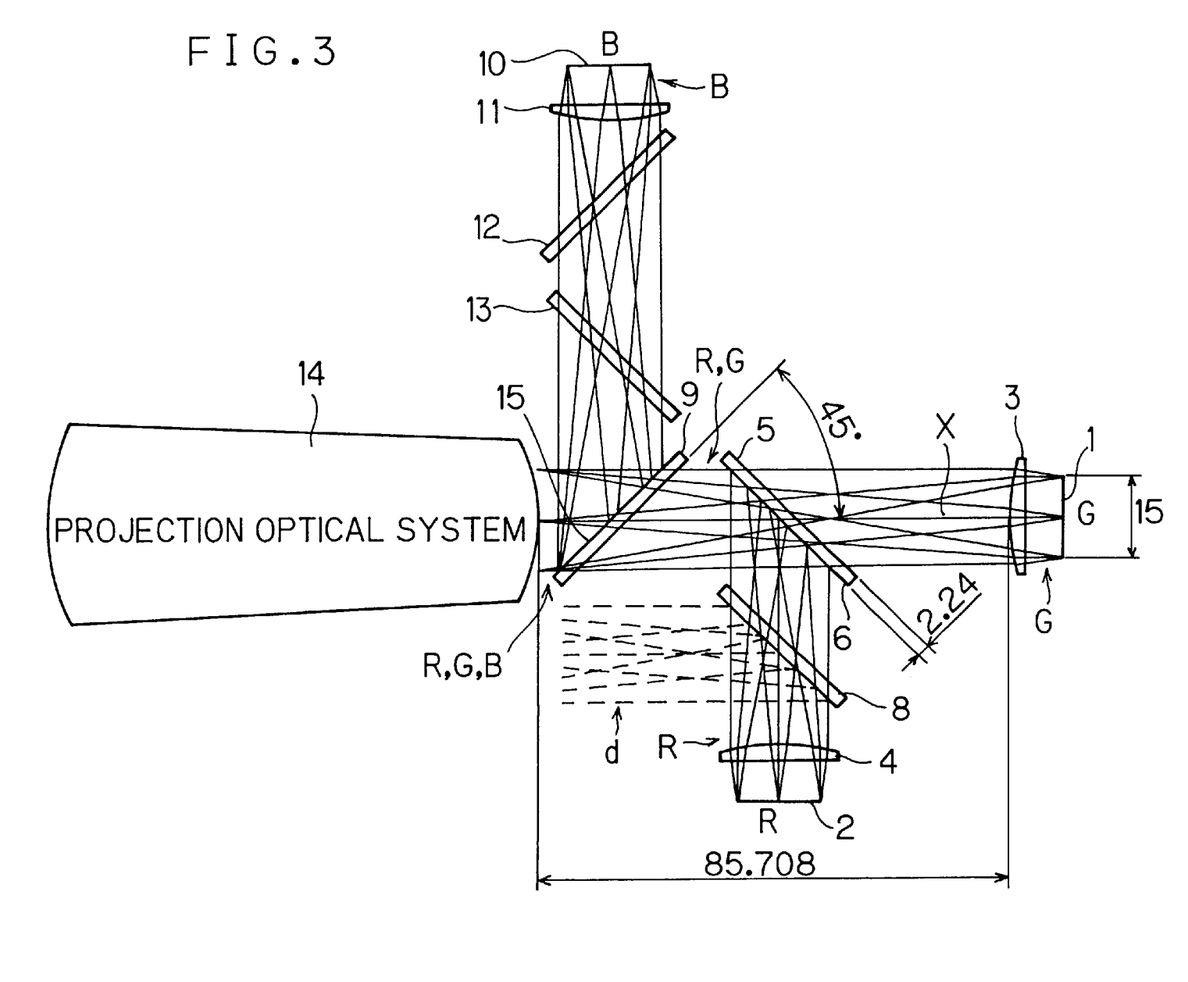
FIG. 3 is a schematic view showing a display optical system using an example of a first embodiment of the color integrating optical device of the present invention.

FIG. 3 schematically shows a display optical system using an example of the first embodiment of the color integrating optical device of the present invention. As shown in the figure, reference numerals 1 and 2 represent display panels, reference numerals 3 and 4 represent condenser lenses of the display panels 1 and 2, respectively, reference numeral 5 represents a dichroic mirror, and reference numeral 8 represents a dummy glass. The dichroic mirror 5 has a dichroic film 6 formed on the obverse surface viewed from the reflection side (the side of the display panel 2). As shown in the figure, a light ray of G (green) emanating from the display panel 1 passes through the condenser lens 3 and is transmitted by the dichroic mirror 5, a light ray of R (red) emanating from the display panel 2 passes through the condenser lens 4 and the dummy glass 8 and is reflected at the dichroic mirror 5, and the light rays are integrated into a light ray of R and G.

Here, the dummy glass 8 creates an optical path corresponding to the dichroic mirror 5 to thereby make the optical path of the light ray of R optically equivalent to that of the light ray of G. At this time, even if part of the light ray of R is reflected at the surface where the light ray of R is incident on the dummy glass 8 to become an unnecessary light ray d shown by the broken line, the unnecessary light ray d does not become a problem because it never reaches the projection optical system 14.

Reference numeral 10 represents a display panel. Reference numeral 11 represents a condenser lens of the display panel 10. Reference numerals 12 and 13 represent dummy glasses each comprising a glass plate for making the optical path of a light ray of B (blue) optically equivalent to that of the light ray of R and G. Reference numeral 9 represents a dichroic mirror. The dichroic mirror 9 has a dichroic film 15 on the obverse surface viewed from the reflection side (the side of the display panel 10). As shown in FIG. 3, the light ray of B emanating from the display panel 10 passes through the condenser lens 11, is transmitted by the dummy glasses 12 and 13 and is reflected at the dichroic mirror 9, the light ray of R and G is transmitted by the dichroic mirror 9, and these light rays are integrated into a light ray of R, G and B.

Since the dichroic mirror 5 is disposed, as a structure for performing color integration, so as to be inclined leftward on the plane of the figure so as to form a predetermined angle (here, 45 degrees) with respect to the optical axis on the optical path, an astigmatic difference is caused by the light ray of G from the display panel 1 passing through the dichroic mirror 5. Further, since the principal rays of the light rays emanating from the parts from the upper end to the lower end of the display panel 1 are incident on the dichroic mirror 5 at different angles, the degree of generation of the astigmatic difference differs between the upper and the lower parts of the image plane.

Therefore, the dichroic mirror 9 as thick as the dichroic mirror 5 is disposed on the optical path so as to form the same angle (here, 45 degrees) with respect to the optical axis X as the dichroic mirror 5 and so as to be inclined toward the opposite side, that is, rightward on the plane of the figure. By doing this, the difference in the degree of generation of the astigmatic difference is canceled between the upper and the lower parts of the image plane, so that the difference in astigmatic difference among positions on the image plane is eliminated. A similar relationship holds when the light ray of R from the display panel 2 is transmitted by the dummy glass 8 and the dichroic mirror 9 and when the light ray of B from the display panel 10 is transmitted by the dummy glasses 12 and 13.

However, since the astigmatic difference itself is not eliminated, in order to correct the astigmatic differences of the light rays of R, G and B having passed through the dichroic mirrors or the dummy glasses, in a projection optical system 14, a lens surface having different optical powers in the directions parallel and vertical to the plane of the figure (being toric) is disposed in such a manner that the lens back focal length is not increased. Examples of this surface include a cylinder surface, a toric surface and a free-form surface.

Obtaining the effective bending space of the color integrating optical device of the first embodiment, the value of the condition (1) will be verified below. The unit of the values associated with length is mm. Here, the lens back focal length LB, that is, the distance from the last surface of the projection optical system 14 to the condenser lens 3 is 85.708, the number n of plates disposed on the optical path is 2, the angle θ of inclination of the plates with respect to the optical axis is 45 degrees, the thickness t of the plates is 2.24, and the length D of the shorter sides of the display panel 1 is 15. Therefore, {85.708−(2.24÷cos 45°)×3×2}÷15=4.45

Thus, the condition (1) is fulfilled.

Figure 4:
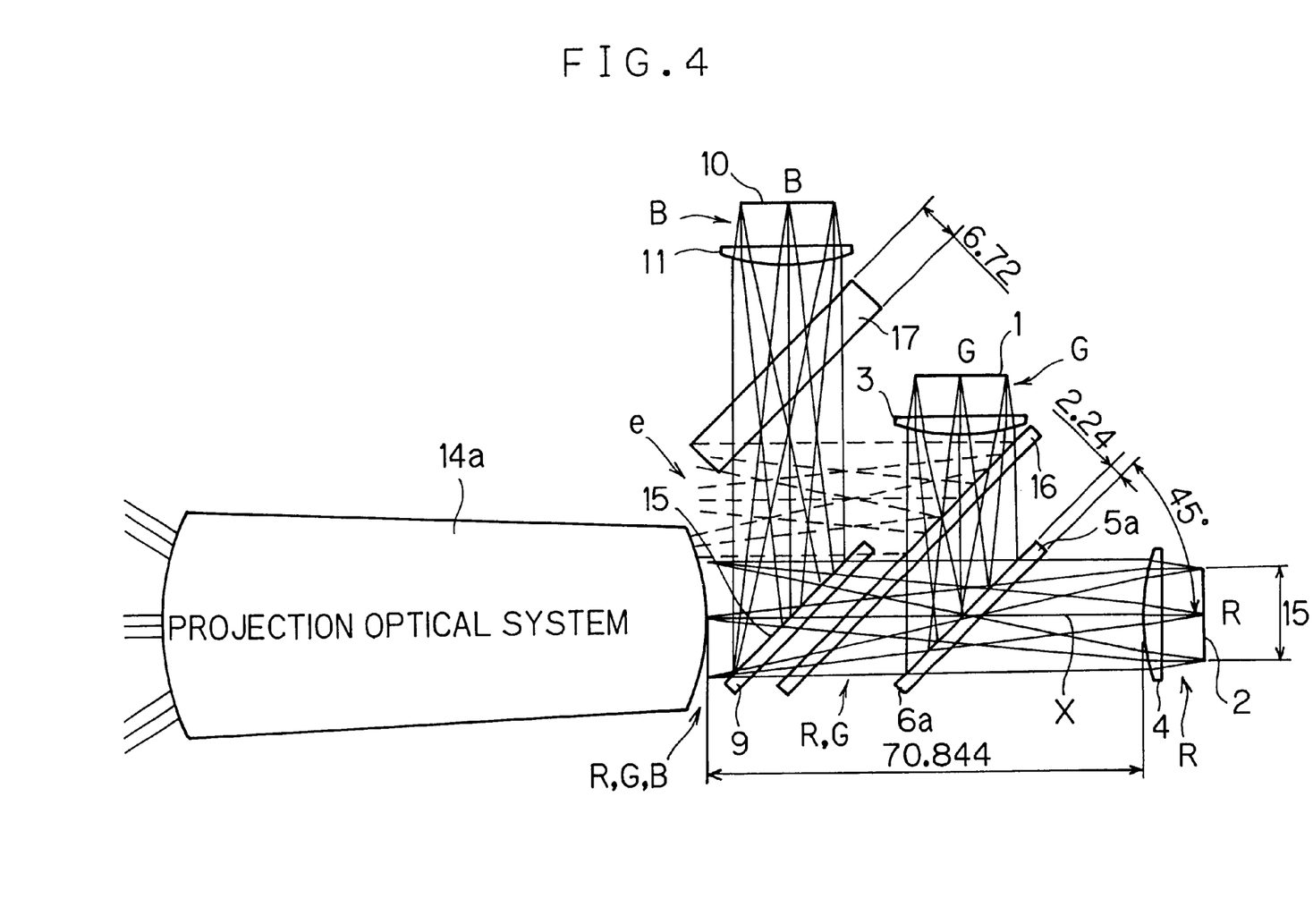
FIG. 4 is a schematic view showing a display optical system using an example of a second embodiment of the color integrating optical device of the present invention.

FIG. 4 schematically shows a display optical system using an example of the second embodiment of the color integrating optical device of the present invention. As shown in the figure, reference numerals 1 and 2 represent display panels, reference numerals 3 and 4 represent condenser lenses of the display panels 1 and 2, respectively, reference numeral 5a represents a dichroic mirror, and reference numeral 16 represents a dummy glass. The dichroic mirror 5a has a dichroic film 6a formed on the obverse surface viewed from the reflection side (the side of the display panel 1). As shown in the figure, a light ray of R emanating from the display panel 2 passes through the condenser lens 4 and is transmitted by the dichroic mirror 5a, a light ray of G emanating from the display panel 1 passes through the condenser lens 3 and the dummy glass 16 and is reflected at the dichroic mirror 5a, and the light rays are integrated into a light ray of R and G.

Here, the dummy glass 16 creates an optical path corresponding to the dichroic mirror 5a to thereby make the optical path of the light ray of G optically equivalent to that of the light ray of R. At this time, even if part of the light ray of G is reflected at the surface where the light ray of G is incident on the dummy glass 16 to become an unnecessary light ray e shown by the broken line, the unnecessary light ray e does not become a problem because it never reaches the projection optical system 14a. In order that the light rays of R and G are again transmitted by the dummy glass 16, the dummy glass 16 has such a large length that the dummy glass 16 lies over two optical paths.

Reference numeral 10 represents a display panel. Reference numeral 11 represents a condenser lens of the display panel 10. Reference numeral 17 represents a dummy glass comprising a glass plate for making the optical path of a light ray of B (blue) optically equivalent to that of the light ray of R and G. Reference numeral 9 represents a dichroic mirror. The dichroic mirror 9 has a dichroic film 15 on the obverse surface viewed from the reflection side (the side of the display panel 10). As shown in FIG. 4, the light ray of B emanating from the display panel 10 passes through the condenser lens 11, is transmitted by the dummy glass 17 having a thickness corresponding to the thickness of three mirrors and is reflected at the dichroic mirror 9, the light ray of R and G is transmitted by the dichroic mirror 9, and these light rays are integrated into a light ray of R, G and B.

Since the dichroic mirrors 5a and 9 and the dummy glass 16 are all disposed, as a structure for performing color integration or a structure for adjusting the optical path, so as to be inclined rightward on the plane of the figure so as to form a predetermined angle (here, 45 degrees) with respect to the optical axis on the optical path, an astigmatic difference is caused by the light ray of R from the display panel 2 passing through the dichroic mirrors 5a and 9 and the dummy glass 16. Further, since the principal rays of the light rays emanating from the parts from the upper end to the lower end of the display panel 1 are incident on the dichroic mirror 5a at different angles and the light rays are then incident on the dummy glass 16 and the dichroic mirror 9 inclined in the same direction, the degree of generation of the astigmatic difference further differs between the upper and the lower parts of the image plane.

In order to correct the astigmatic difference that differs between the upper and the lower parts of the image plane as described above, an element asymmetrical in the vertical direction, such as a free-form surface or lens decentering in the vertical direction of the image plane, is disposed in the projection optical system 14a. A similar relationship holds when the light ray of G from the display panel 1 is transmitted by the dummy glass 16 and the dichroic mirror 9 and when the light ray of B from the display panel 10 is transmitted by the dummy glass 17. In order to correct the astigmatic differences themselves of the light rays of R, G and B having passed through the dichroic mirrors or the dummy glasses, in the projection optical system 14a, a lens surface having different optical powers in the directions parallel and vertical to the plane of the figure (being toric) is disposed in such a manner that the lens back focal length is not increased. Examples of this surface include a cylinder surface, a toric surface and a free-form surface.

Obtaining the effective bending space of the color integrating optical device of the second embodiment, the value of the condition (1) will be verified below. The unit of the values associated with length is mm. Here, the lens back focal length LB, that is, the distance from the last surface of the projection optical system 14a to the condenser lens 4 is 70.844, the number n of plates disposed on the optical path is 3, the angle θ of inclination of the plates with respect to the optical axis is 45 degrees, the thickness t of the plates is 2.24, and the length D of the shorter sides of the display panel 2 is 15. Therefore, $$\{70.844-(2.24 \div \cos 45°) \times 3 \times 2\} \div 15 = 2.82$$

Thus, the condition (1) is fulfilled.

In the case of this embodiment, although there is a defect that the difference in astigmatic difference between the upper and the lower parts of the image plane is large and the correction by the projection optical system therefore becomes a burden, there is an advantage that the lens back focal length is shorter than that of the first embodiment so that the optical system is compact.

While the dichroic mirrors have a structure in which a glass plate is coated with a dichroic film, at this time, a problem arises that the glass plate deforms due to the stress of the dichroic film. When the deformation of the glass plate is large, distortion of the reflecting surface measured based on the Newton's ring is unacceptable. To prevent such deformation, normally, the thickness of the glass plate is defined so that the distortion is within the permissible range.

Specifically, the dimensions are set so that the following condition (2) is fulfilled:

$$8 < D_a/t_a < 50 \qquad (2)$$

where:

$t_a$ is the thickness of the glass plate coated with the dichroic film; and $D_a$ is the longer sides or the longer diameter, being used, of the dichroic mirror in an effective range. When the value of the condition (2) is equal to or greater than its upper limit, the distortion is too large. When the value of the condition (2) is equal to or less than its lower limit, the glass plate is too thick, so that the cost is high. Further, it is desirable to set the dimensions so as to fulfill the following condition, because this is more advantageous both in distortion and cost:

$$8 < D_a/t_a < 20$$

Image light rays recited in the claims correspond to the light rays emanating from the display panels in the embodiments.

What is claimed is:

1. A color integrating optical device for integrating different color rays from a plurality of display devices each of which has a condenser lens in front thereof and emitting the integrated color rays to a non-telecentric projecting optical system, comprising:

a plurality of dichroic mirror plates, each having a dichroic film, the dichroic mirror plates integrating the color rays by the dichroic film in which a set of color rays from one of display devices reflects thereon and another set of color rays from the other of display devices transmits thereon, the dichroic film being formed on an incident surface of a set of color rays to be reflected;

a dummy plate provided on an optical path of color rays to be reflected by the dichroic film so that unnecessary rays caused by part of the color rays being reflected at the dummy plate does not emit to the non-telecentric projecting optical system; and wherein the following condition is fulfilled:

$$2 < \{LB - (t \div \cos \theta) \times 3 \times n\} \div D < 5$$

where:

LB is a distance from a most integrating optical device side surface of the non-telecentric optical system to one of the condenser lens;

n is the number of plates disposed on the optical path;

θ is a tilt angle of the thickest plate with respect to an optical axis of the non-telecentric optical system;

t is a thickness of the thickest plate; and

D is a length of the display device in direction parallel to a plane formed by the color rays that are bent by the dichroic mirror plate.

2. A color integrating optical device as claimed in claim 1, wherein the plurality of dichroic mirror plates includes first and second dichroic mirror plates that are inclined in opposite directions with respect to the optical axis.

3. A color integrating optical device as claimed in claim 1, wherein the plurality of dichroic mirror plates includes the first and the second dichroic mirror plates that are inclined in the same direction with respect to the optical axis.

4. A color integrating optical device as claimed in claim 1, wherein shorter sides of the image display devices are parallel to the planes formed by the image light rays that are bent by the dichroic mirrors.

5. A color integrating optical device as claimed in claim 1, further comprising a dichroic mirror fulfilling the following condition:

$$8 < D_a/t_a < 50$$

where:

$t_a$ is a thickness of a glass plate coated with a dichroic film; and $D_a$ is a longer side or a longer diameter, being used, of the dichroic mirror in an effective range.

6. A display optical system comprising:

a color integrating optical device for integrating different color rays from a plurality of display devices each of which has a condenser lens in front thereof and emitting the integrated color rays to a non-telecentric projecting optical system, comprising:

a plurality of dichroic mirror plates, each having a dichroic film, the dichroic mirror integrating the color rays by the dichroic film in which a set of color rays from one of display devices reflects thereon and another set of color rays from the other of display devices transmits thereon, the dichroic film being formed on an incident surface of a set of color rays to be reflected;

a dummy plate provided on an optical path of color rays to be reflected by the dichroic film so that unnecessary rays caused by part of the color rays being reflected at the dummy plate does not emit to the non-telecentric projecting optical system; and wherein the following condition is fulfilled:

$$2<\{LB-(t+\cos\theta)\times 3\times n\}\div D<5$$

where:
LB is a distance from a most integrating optical device side surface of the non-telecentric optical system to one of the condenser lenses;
n is the number of plates disposed on the optical path;
$\theta$ is a tilt angle of the thickest plate with respect to an optical axis of the non-telecentric optical system;
t is a thickness of the thickest plate; and
D is a length of the display device in direction parallel to a plane formed by the set of color rays that are bent by the dichroic mirror plate; and
a projection optical system for projecting the color rays,
wherein an optical member for correcting an astigmatic difference caused by the color integrating optical device is provided in the projection optical system.

7. A display optical system as claimed in claim 6, wherein the plurality of dichroic mirror plates includes first and second dichroic mirror plates that are inclined in opposite directions with respect to the optical axis.

8. A display optical system as claimed in claim 6, wherein the plurality of dichroic mirror plates includes the first and the second dichroic mirror plates that are inclined in the same direction with respect to the optical axis.

9. A display optical system as claimed in claim 6, wherein shorter sides of the image display devices are parallel to the planes formed by the image light rays that are bent by the dichroic mirrors.

10. A display optical system as claimed in claim 6, wherein the color integrating optical device further comprising a dichroic mirror fulfilling the following condition:

$$8<D_a/t_a<50$$

where:
$t_a$ is a thickness of a glass plate coated with a dichroic film; and
$D_a$ is a longer side or a longer diameter, being used, of the dichroic mirror in an effective range.

11. A color integrating optical device comprising:
a first display device for providing a first color image along a first path;
a second display device for providing a second color image along a second path;
a dichroic mirror plate having a dichroic film, wherein the dichroic mirror plate is positioned to integrate the first color image and the second color image by transmitting the first color image through the dichroic mirror plate along the first path and reflecting the second color image from the second path to the first path, the dichroic film being formed on an incident surface of the second color image; and
a dummy plate provided on the second path between the second display device and the dichroic mirror plate.

12. A color integrating optical device as claimed in claim 11,
wherein the dummy plate is positioned at an angle relative to the second path approximately equal to the angle at which the dichroic mirror plate is positioned relative to the first path.

13. A color integrating optical device as claimed in claim 11,
wherein the dummy plate is positioned at an angle relative to the second path and has a thickness such that the dummy plate causes an astigmatic difference in the second color image approximately equivalent to the astigmatic difference in the first color image caused by the dichroic mirror.

14. A color integrating optical device as claimed in claim 11, further comprising a projection optical system including a lense that corrects the astigmatic differences caused by the dummy plate and the dichroic mirror plate.

15. A color integrating optical device comprising:
a first display device for providing a first color image along a first path;
a second display device for providing a second color image along a second path;
a third display device for providing a third color image along a third path;
a first dichroic mirror plate having a dichroic film, wherein the first dichroic mirror plate is positioned to integrate the first color image and the second color image to produce a first integrated image by transmitting the first color image through the first dichroic mirror plate along the first path and reflecting the second color image from the second path to the first path, the dichroic film being formed on an incident surface of the second color image;
a second dichroic mirror plate having a dichroic film, wherein the second dichroic mirror plate is positioned to integrate the first integrated image and the third color image to produce a second integrated image by transmitting the first integrated image through the second dichroic mirror plate along the first path and reflecting the third color image from the third path to the first path, the dichroic film being formed on an incident surface of the second color image;
a first dummy plate provided on the second path between the second display device and the first dichroic mirror plate; and
a second dummy plate provided on the third path between the third display device and the second dichroic mirror plate.

16. A color integrating optical device as claimed in claim 11,
wherein the dummy plate is positioned at an angle relative to the second path approximately equal to the angle at which the dichroic mirror plate is positioned relative to the first path.

17. A color integrating optical device as claimed in claim 11,
wherein the dummy plate is positioned at an angle relative to the second path and has a thickness such that the dummy plate causes an astigmatic difference in the second color image approximately equivalent to the astigmatic difference in the first color image caused by the dichroic mirror.

18. A color integrating optical device as claimed in claimed in claim 11, further comprising a projection optical system including a lens that correct the astigmatic differences caused by the dummy plate and the dichroic mirror plate.

* * * * *

UNITED STATES PATENT AND TRADEMARK OFFICE
CERTIFICATE OF CORRECTION

PATENT NO. : 6,529,332 B2
DATED : March 4, 2003
INVENTOR(S) : Kenji Konno

It is certified that error appears in the above-identified patent and that said Letters Patent is hereby corrected as shown below:

<u>Column 11,</u>
Line 24, delete "{70.844–(2.24÷cos 45°) x 3 x 2 } ÷ 15=2.82", and insert
-- {70.844–( 2.24 ÷cos 45° )x 3 x 3} ÷ 15=2.82 --.

<u>Column 12,</u>
Line 28, after "in", insert -- a --.

<u>Column 16,</u>
Line 1, delete "correct", and insert -- corrects --.

Signed and Sealed this

Second Day of March, 2004

JON W. DUDAS
*Acting Director of the United States Patent and Trademark Office*